INVENTOR.
WALTER M. BIERNAT
BY
Mason, Kolehmainen, Rathburn and Wyss
ATTORNEYS

INVENTOR.
WALTER M. BIERNAT
BY
Mason, Kolehmainen, Rathburn and Wyss.
ATTORNEYS

MOLECULAR STORAGE UNIT

Filed Feb. 8, 1960 4 Sheets-Sheet 3

INVENTOR.
WALTER M. BIERNAT
BY
Mason, Kolehmainen, Rathburn and Wyss.
ATTORNEYS

MOLECULAR STORAGE UNIT

Filed Feb. 8, 1960

INVENTOR
WALTER M. BIERNAT
BY Mason, Kolehmainen, Rathburn and Wyss.
ATTORNEYS

United States Patent Office 3,119,099 Patented Jan. 21, 1964

3,119,099

MOLECULAR STORAGE UNIT

Walter M. Biernat, Chicago, Ill., assignor to Wells-Gardner Electronics Corporation, a corporation of Illinois Filed Feb. 8, 1960, Ser. No. 7,303
8 Claims. (Cl. 340—173)

This invention relates to a data storing means, and, more particularly, to means for storing data in and reading data out of a molecular storage unit.

The bit storage requirements of modern data handling equipment, such as communication networks and computers, are so large that the memory sections of these systems are costly and require an inordinate amount of installation space. In addition, many of the common types of permanent and intermediate storage means, such as magnetic drums or cores or assemblies of bistable switching components, are relatively slow in response with the attendant increase in the access time required to readout a stored data item. These limitation are of increased significance when the data handling equipment is designed for use in mobile applications in which the storage or record and playback or access time must be maintained at as low a level as possible.

Accordingly, one object of the present invention is to provide a new and improved data storing means.

Another object is to provide a means for storing data by controlling the molecular structure of a material.

Another object is to provide a data storage unit in which a data bit is stored by shifting the molecular structure of a material to a selected one of a pair of states.

A further object is to provide data storage units in which a data bit stored in the mass of material by altering the molecular structure of the material and is read out by detecting the energy radiated from the material.

A futrher object is to provide means for storing a plural bit data item in which the molecular structures of a plurality of different groups of atoms are altered in accordance with the bits of the data item to be stored.

Another object is to provide a data storing means including input means for selectively applying radiant energy to a material to alter its molecular structure in accordance with a data bit to be stored and output means responsive to energy radiated by the material for providing an indication of the data bit stored in the material.

A further object is to provide a method of storing and reproducing data which comprises altering the molecular structure of the material in accordance with the data to be stored and reading the stored data out of the material by detecting the energy radiated by the material.

Another object is to provide a method of storing plural bit data items which comprises selectively altering the structural arrangement of different groups of atoms under the control of different bits of the data item to be stored.

A further object is to provide a data storage means including input means controlled by data bits to be stored for applying controlled magnetic and alternating current fields to a material to alter its molecular structure and output means responsive to the nuclear magnetic resonant frequencies of the material for providing an indication of the stored data bits.

In accordance with these and many other objects, an embodiment of the invention comprises a data storing means including a mass of material having one or more atoms or groups of atoms that can be shifted between at least two molecular structural arrangements in response to received radiant energy. In an elemental storage unit in which only a single data bit is to be stored, the material can include only a single atom or group of atoms whose molecular structure can be shifted between two structural arrangements by the application of radiant energy. When the data bit is to be stored in the unit, radiant energy in the infrared, ultraviolet, radio, or microwave frequency range is applied to the material to shift the molecular structure of the material from a first state to a second state. The data bit stored in the material is read out by stressing or exciting the material and detecting the energy radiated by the material to determine whether the molecular structure of the material is in its first state or has been shifted to its second state. This indication denotes whether a data bit has been stored in the material.

In another form in which a single data storing means is capable of storing a plural bit data item, the material used includes a plurality of different atoms or groups of atoms, each of which can be shifted between two structural arrangements by received energy of different characteristics, such as frequency. When a plural bit word or data item is to be stored in this unit, a combination of energies of different characteristics corresponding to the different bits to be stored is applied to the material so that some of the structural arrangements remain in a first state and others of the molecular structures are shifted to a second state. Thus, the pattern of first and second structural arrangements provided by the plurality of groups of atoms in the material provides a stored representation of the entered data item. When the stored data item is to be read out, the material is excited or subjected to stress, and detecting means responsive to the energy radiated by the material provides an indication of the pattern of structural arrangements and thus, of the data item stored in the material.

In one specific embodiment forming an elemental bit storage unit, the material of the storage unit is capable of being shifted between two molecular structures under the combined stress provided by an alternating current field and a magnetic field. If the material is assumed to be in a first molecular structure, a data bit is stored in the unit by applying a controlled alternating current and magnetic field to the material to cause at least a portion of the material to shift to its second molecular structure. Since the molecular structure of the material in its first and second states provide different nuclear magnetic resonant frequencies, this phenomenon can be used to read the stored data bit out of the material. To accomplish this, a combined magnetic and alternating current field, which preferably is of less intensity than the data storing field and which includes components of the nuclear magnetic resonant frequencies, is applied to the material. A detecting means including a pair of filters tuned to both of the nuclear magnetic resonant frequencies is coupled to the material so that the presence of one or the other of the nuclear magnetic resonant frequencies provides an indication of the molecular structure of the material and, accordingly, provides an indication of whether a data bit has been stored in the material.

In a second embodiment in which a single data storage means is capable of storing a plural bit data item, the material includes a plurality of groups of atoms, each capable of being shifted to a first or a second structural arrangement. Each of these groups of atoms responds to incident energy of a particular frequency different than the frequencies for the other groups of atoms and possesses two different nuclear resonant frequencies corresponding to the two structural arrangements to which the group of atoms can be adjusted. Accordingly, when a plural bit data item is to be stored, a combination of different magnetic and alternating current fields corresponding to the different bits of the data item is applied to the material so that certain of the groups of atoms remain in their first structural arrangement and others of the groups of atoms are shifted to their second structural arrangement. To read out the stored data item, a combined magnetic and alternating current field of lesser intensity than the storage field and including components of all of the nuclear resonant frequencies of the plurality of groups of atoms is applied to the material. A detecting means including filters tuned to the nuclear resonant frequencies is coupled to the material and is energized by the energy radiated from the material to provide an indication of the pattern of structural arrangements in the material. Since this pattern of structural arrangements conforms to the plural bit data item stored in the material, the data item stored therein is recovered from the material without destroying the storage of this item in the material.

Many other objects and advantages of the present invention will become apparent from considering the following detailed description in conjunction with the drawings in which.

Figure 1:
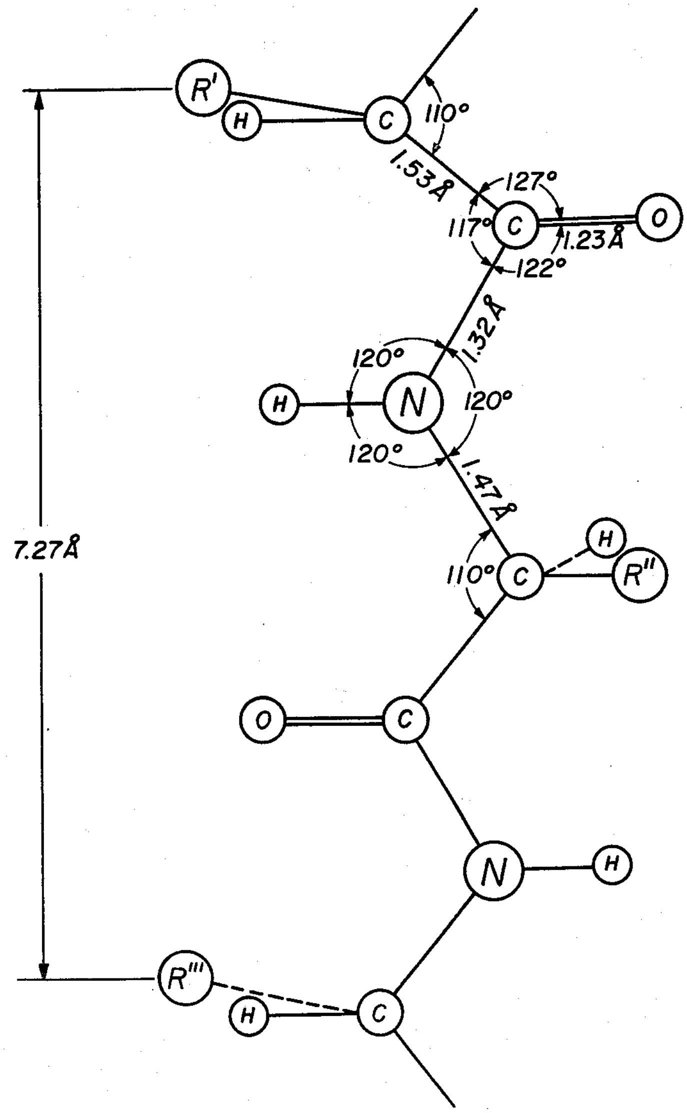
FIG. 1 is a diagram of the three-dimensional structure of a peptide chain.

A multitude of discrete meta-stable states can be induced in the molecules of certain materials, and these states can be controlled by external forces. The number of stable discrete states available in a given material will be a direct function of the complexity of the molecule of the material, i.e., its molecular weight and its spacial configuration. Molecules have characteristic, three dimensional structures which are well defined and stable under normal quiescent conditions. These molecules retain their physical configuration in space due to atom to atom bonds (co-valent bonds) and electrostatic restrictions on the movement of groups of atoms. Intramolecular movement of groups is restrained by the balances of electronic charges and by hindrance to shifts caused by adjacent groups (steric hindrance). Thus groups of interconnected atoms or radicals maintain a constant position relative to the molecule's coordinates or its axis of symmetry. By coupling discrete bursts of energy into such a molecule it is possible to overcome the electrostatic restrictions on the molecule's configuration and cause a shift of one or more radicals or branch chains to a new stable position.

A new spacial configuration will form as the molecule rearranges itself to an electrical balance again. In large, multi-branched molecules, this process may be repeated through hundreds or thousands of different stable spacial configurations. Under certain conditions, this process can be reversible and the molecule can be stepped backward through a sequence of its different configurations till it is reset to a zero or ground reference state. Each meta-stable spacial configuration is unique and can be detected by optical or radio readout techniques.

This property of existing in many different states is found in macro-molecules consisting of long chains of atoms having large numbers of minor but different branches or radicals. The greater the entropy or dissymmetry of the molecule, the larger the number of possible permutations of its spacial configuration. This multi-state property is also characteristic of cyclic or ring molecules with unsymmetrical branching and of combinations of ring molecules and long chain groups. Substances with many long multi-branched chains, linear or cyclic, are quite common.

In regard to spacial configurations, molecular structures take many forms. Long linear chains of atoms occur with offshoots of minor branches of atoms or radicals. The attached minor branches can be the same or different atoms or groups of atoms and they can be simple or complex and multi-branched themselves. Naturally, molecular configurations occupy three-dimensional space although many molecules are planar. An example is the complex multi-branched molecule of polybutadiene, a form of synthetic rubber. One such molecule contains many thousands of carbon atoms and hundreds of branches. The branches are not in the same plane but form a three-dimensional lattice in space. In addition, the chains are not necessarily linear but are angular, forming incomplete rings. The final structure results from the balancing of the electrostatic fields of the atoms and the net energy flow into the molecule. Atoms in molecules occupy relatively fixed but not definitely fixed positions. They are constantly oscillating around their positions of minimum potential energy with excursions of about 0.1 Angstrom. In addition, each atom will have translational and rotational oscillations of small amplitude through its center of gravity but not large enough to affect the strong atom-to-atom covalent bond that forms the chain.

Chains of atoms can be formed into rings with as many as twenty or more atoms forming one ring. Some cyclic molecules contain atoms of the same kind in the ring (carbocyclic) and others have different atoms in the same ring (heterocyclic). Materials with several condensed rings in the molecule are also quite common. Cyclic molecules are of importance to the proposed molecular digital technique due to their capability of being bent and distorted in space. Cyclic molecules can have many minor linear branches (atoms or radicals), simple or complex, attached to the ring atoms. Such branch chains can be directed to one or the other side of the plane of the ring forming different meta-stable states.

Molecular rearrangements may take any one of several forms. In one type of molecular rearrangement, an atom or group of atoms forming a branch chain shifts its position in space with respect to some reference axis of the molecule. The atom or group of atoms will move as a unit through an angle of rotation depending on adjacent electrostatic atomic fields. The electrostatic atomic bonds are not broken although the interatomic distances may change somewhat. This rearrangement can be pictured as a distortion of the molecule's structure. A complex multibranched molecule may be induced into a series of consecutive rearrangements and will exist in a number of different distorted forms. For computational or storage purposes the input energy to the molecule must be kept below the level where bond ruptures take place.

Cyclic molecules can undergo a slightly different kind of rearrangement. From theoretical considerations the cyclohexane molecule can exist in two stable space configurations called the "cradle" and the "chair" configuration. These names describe the bent shape of the molecule. The "chair" configuration has a minimum potential energy requirement and cyclohexane exists primarily in this form. But with additional energy the plane of the cyclohexane molecule may be bent into the second space configuration. Many organic materials contain several cyclic structures either separately or condensed together. Such multiplanar molecules can be distorted into various shapes by the bending of the rings. Each meta-stable stage of the distorted molecule can represent one bit of stored data.

Compound molecules which contain linear branches connected to ring atoms show another form of molecular rearrangement. The plane of the ring molecule is the reference for the relative positions of the branches. A chain of atoms can shift from one side of the plane to the other side. If a number of different branch chains are connected to a ring molecule, there will be a series of chains that can be consecutively shifted. Thus one molecule can have a multi-bit storage characteristic.

The molecular rearrangement mechanisms described are all basically similar. Discrete shifts of atoms take place under an external influence producing a series of new meta-stable space configurations of the material. The branches of the molecules have a certain number of degrees of freedom. Certain shifts are allowed and other molecular shifts are not allowed depending on the electrostatic environment of the branch. The electrostatic forces around a branch chain of atoms determine the degrees of freedom of that branch with respect to shifting its position relative to the host molecule. The number of allowable molecular shifts are also a function of the potential energy of the molecule and the energy flow into and out of the molecule.

Interatomic distances in molecules are of the order of magnitude of 1.0–2.0 Angstroms. The exact dimensions will depend on the nature of the material. FIG. 1 shows a part of a protein peptide chain with the measured bond lengths and bond angles. These measurements are based on X-ray and polarized infrared diffraction techniques. The structure shown is a three-dimensional structure and the bonds are not in the same plane. The R-primes represent different radicals or branch chains. Switching of the R-prime group from its present location to the other side of the molecules' axis would be a movement of about 1 Angstrom. The shift of R-prime would require an adjustment of bond distances and some repositioning of the adjacent oxygen atom to achieve electronic balance. If the shift were only 90°, the arc length that R-prime traverses is about 0.5 Angstrom unit. Molecular shifts ordinarily are of such small magnitudes and therefore switching time can be very short and switching power very small.

The inversion frequency of the ammonia molecule is approximately 24 kilo-megacycles per second. This amounts to about 10 micro-microseconds for one flip of the nitrogen atom through a distance of about one Angstrom. The order of magnitude of molecular switching time is from one to ten micro-microseconds depending on the mass of the branch. It is natural that heavier atoms or large branch chains have longer switching times. The switching time is also a function of the amplitude of the inducing energy.

The amount of energy required to induce a discrete shift of a branch chain can be obtained by subtracting the calculated potential energy of one of the space configurations from the potential energy of the distorted space configuration. The order of magnitude of energy required is about 20–50 kilogram calories per mole of material. In an actual application of a working molecular digital computer, about $10^{-5}$ mole is employed and the energy required is correspondingly smaller. For example, the amount of energy required to induce a single shift is approximately $2\times10^{-21}$ watt-seconds.

Figure 2:
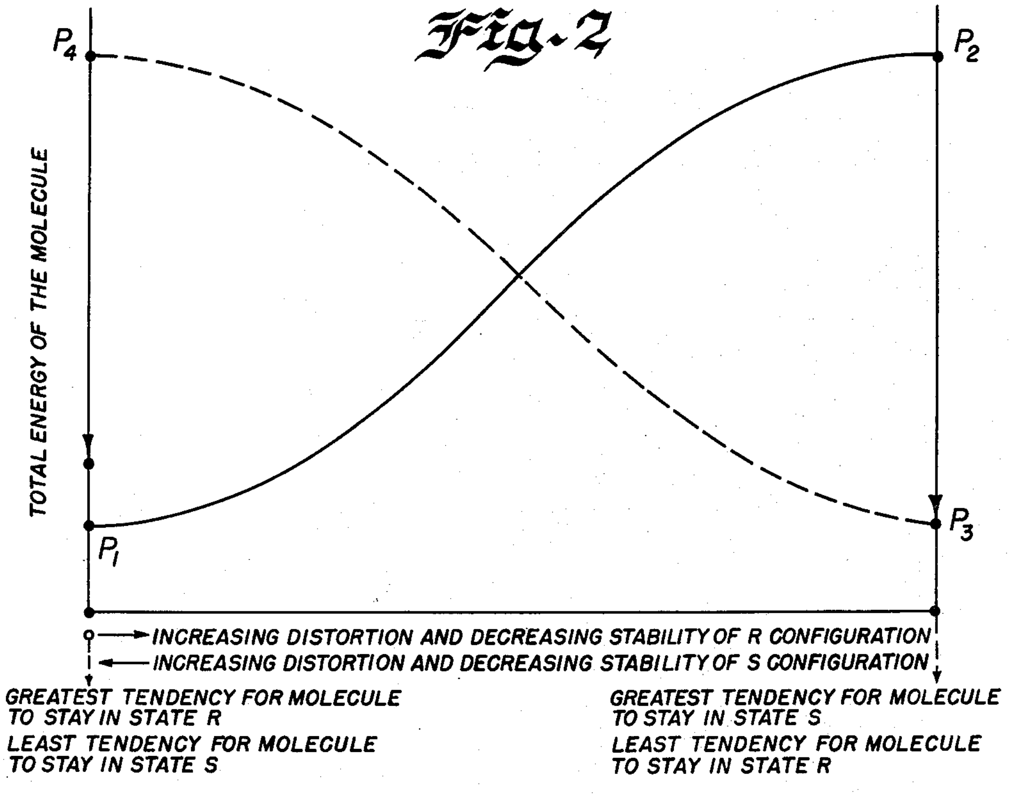
FIG. 2 is a graph showing the energy relationships in a molecule which can exist in two states.

The potential energy content of a molecule is equal to the amount of energy needed to dissociate it, in the gaseous state, into isolated gaseous atoms. This means that each inter-atomic bond must be broken by an amount of input energy equal to the bond energy for each type of bond present in the molecule. The most stable molecular structure is that space configuration that has the lowest total energy. If energy is coupled into the molecule in its stable form, the molecule becomes distorted and assumes a new configuration of higher energy content and, therefore, less stability—i.e. a meta-stable state. FIG. 2 shows the energy relationships between two different configurations of a molecule. At the start the molecule is at its minimum energy content and most stable condition in structure R—on the diagram this is point $P_1$. As energy is absorbed by the molecule, it will become distorted and it becomes less stable, i.e. there will be an increasing tendency to rearrange into another more stable form. At point $P_2$ maximum energy has been absorbed by the molecule, the molecule is highly distorted in space, and the tendency is great that it will rearrange itself to a new, more stable space configuration. The rearrangement takes place and the new stable configuration forms. On the graph this amounts to a jump from $P_2$ to $P_3$.

Figure 3:
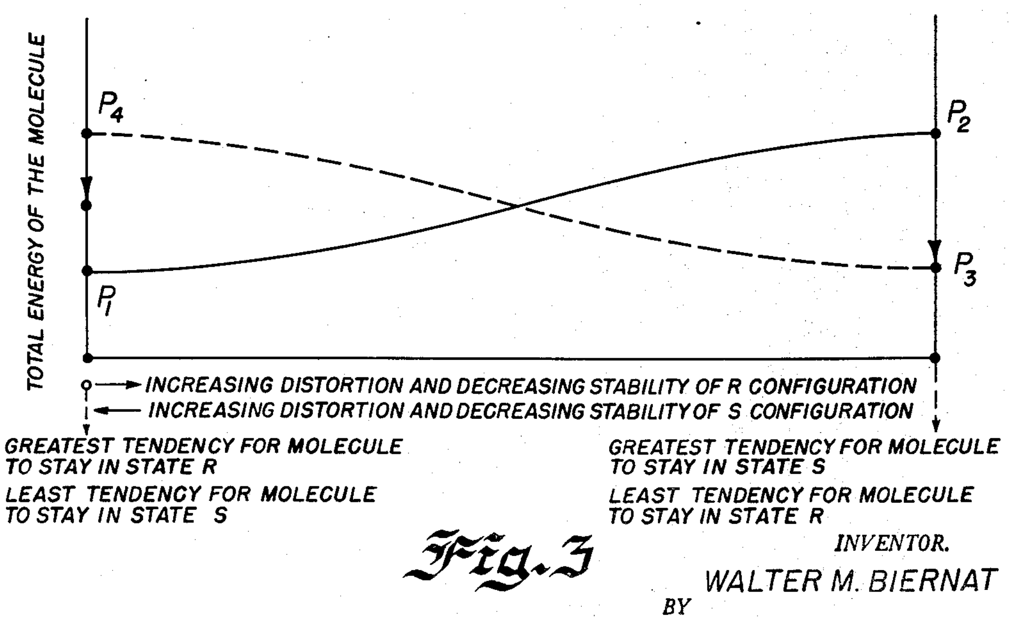
FIG. 3 is a graph showing the energy relationships in a two-state molecule having a low energy barrier.

At $P_3$ the molecule is now in state S. It is the same material as R but has a different spacial configuration. Branch chains have been reoriented in the molecule or bends have formed in the planes of ring molecules. Now if energy is coupled again into the S configuration, the point $P_3$ will move along the S curve as the new molecular configuration undergoes further distortion. The increasing distortion again means less stability and an increasing tendency to change into the R configuration or some other new configuration. At point $P_4$, maximum energy has been coupled into the S configuration of the molecule and it is under maximum distortion. The molecule then rearranges into state R or a third state and the operating point jumps from $P_4$ to $P_1$. FIG. 2 represents a case where the structures R and S differ appreciably in the relative positions of the atomic groups affected so that a large distortion of the molecule is required to change one configuration into the other. Thus the energy required for the rearrangement is still large compared with the average thermal energy of the molecules or the average thermal input energy from the environment. In this case the tendency for the material to change from state R to state S is not great and S and R are well defined materials under normal energy conditions. FIG. 3 shows a similar cycle of a material with two possible stable states but where the difference in the atomic configurations of the two structures is small. The energy of distortion or conversion is small, possibly of the order of magnitude of the average thermal energy. Thus, the change of R to S and S to R can occur readily and neither state will be well defined. The material consists of a mixture of R and S in dynamic equilibrium. The proportion of R to S depends on the transient energy inputs with amplitudes greater than the distortion energy.

For applications to digital storage or digital computation, the molecular shift must be reversible. It is necessary to be able to reverse the process and bring the molecule back into its normal or zero state, that is, to reset the molecule. Energy absorbed by a molecule in its transition to a new state can be emitted with a return to its previous space configuration. If the energy barrier is low then the conversion of one form into another is readily accomplished. In some materials the energy barrier is so low that the material exists as a mixture of two different space configurations in equilibrium. This invention requires a material whose meta-stable states can be switched back and forth with a moderate amount of input energy. Materials with low energy barriers are unstable and transient thermal energies may be enough to cause changes in state. High energy barrier materials are stable and would form well defined meta-stable states. The energy barrier is selected to be of such amplitude that excessive switching powers are not required.

A simple picture of the molecular storage mechanism can be obtained by considering the behavior of the ammonia molecule. The molecule contains one nitrogen atom and three hydrogen atoms. Its space configuration is tetrahedral. The three hydrogen atoms form the base plane of a tetrahedron with the nitrogen atom at an apex. But it has been discovered that the nitrogen atom vibrates back and forth between two positions. It passes through the plane of the hydrogen atoms to a peak excursion on the other side and then returns. Thus, it oscillates with a harmonic motion at a rate around 24 kilo-megacycles per second. If this oscillation can be arrested, or stopped at will, then the ammonia molecule itself could be used as a binary storage device. This is not possible but the flip-flop action of the ammonia molecule serves as a simple example of a possible molecular counting mechanism. More complex examples will involve non-oscillatory shifts of chains of atoms.

The butadiene molecule exists in two possible space structures. This two-state system has a low energy barrier and the change in state is readily induced. The cis-butadiene configuration has the methylene ($CH_2$) groups adjacent to each other. In the transbutadiene configuration, a methylene and a hydrogen group have rotated so the methylene groups are on opposite sides. The potential energy difference in the two possible configurations is such that thermal energy can produce the change in state. At ordinary room temperatures, the transbutadiene configuration is most stable but as the temperature is increased and energy added it is converted into the cis-form. In this molecule, only two different space configurations are possible and each butadiene molecule has a storage capability of one bit.

An example of a molecule with a high energy barrier between two possible states is 2′-bromo-6′-nitro-6-chloro-2-phenyl benzoic acid (BNCPA) which contains two benzene rings. The planes of the benzene rings are almost at right angles to each other and one ring has a nitro group ($NO_2$), and a bromo group (Br), and the other a chloro (Cl) and carboxyl group. These groups or chains are inclose proximity in space and their electronic fields interact and prevent rotation of the benzene rings around the connecting bond. The atomic groups hinder the rotation and an appreciable amount of energy is required to cause this change in state. Different space configurations can be produced by the rotation of an atom or group of atoms around a covalent bond. Such new space configurations are called rotational isomers.

Two structures are formed by inducing rotation of one benzene ring with its branches through 180°. Both of these structures exist and are unique. If the BNCPA molecule can be switched from one structure to the other structure, it is the equivalent of storing one bit of digital data. This is a property of one molecule. One bit, however, is not its maximum storage capacity. The BNCPA molecule has other unique space configurations. A number of hypothetical models of the BNCPA molecule can be constructed with different space structures. These models are formed by permutations of the positions of the different branch chains. Branch chains can be adjacent to or distant from other branch chains of the same molecule depending on which side of the plane of the benzene ring the groups will lie. Thus, the BNCPA molecule may exist in five unique meta-stable states. Each state or shift has been associated with a significant figure in a binary number. Thus, one BNCPA molecule can act as a 5-position binary counter with a storage capability of 32 bits.

Thus, a relatively small quantity of BNCPA can be used as the basic unit for building up a large storage capacity and a large arithmetic capacity in small molecular volumes.

In one molecule there are the equivalent of five independent switches or go-no-go events. Each of the five can be controlled separately by some energy variable such as frequency or amplitude. For instance, it takes a higher energy burst to switch a bromo group than a chloro group. Thus, each molecule acts as a multichannel computer component.

A more complex molecule with a higher molecular weight, such as the cyclic Gramicidin-S molecule, is useful as a multichannel computer component. The Gramicidin molecule is a derivative of penicillin and contains many side branches. The molecule is symmetrical which may reduce the number of modes possible but it can be made unsymmetrical by a simple replacement of a hydrogen atom with another group or even by an isotope of hydrogen.

On examining the Gramicidin molecule, it can be seen thta the following groups may undergo discrete shifts in their spacial position with respect to some selected zero or reference state:

(1) Oxygen atom—O; 10 atoms/molecule.
(2) Methyl group—$CH_3$; 4 methyl groups/molecule.
(3) Amino group—$NH_2$; 2 amino groups/molecule.
(4) A group—CH—$(CH_3)_2$; 2 A groups/molecule.
(5) B group—$(CH_2)_3$—$NH_2$; 2 B groups/molecule.
(6) C group—$CH_2$—CH—$(CH_3)_2$; 2 C groups/molecule.
(7) D group—$CH_2$—$C_6H_5$; 2 D groups/molecule.

Thus, a total of twenty-four (24) discrete shifts may be possible. This number represents only atomic or branch shifts and does not include any additional modes obtainable by bending or distorting the entire molecular ring. If the twenty-four discrete shifts are unique, independent, and can be controlled sequentially, then each shift can represent a significant position in a binary number. Thus, there are twenty-four positions in this molecular binary counter with an upper numerical limit of $2^{23}$ or 16,777,216 bits. Used as a memory device, the Gramicidin molecule has a basic storage capacity of twenty-four bits per molecule.

But on examining the nature of the Gramicidin molecule further, a number of additional interesting possibilities come to light. If the switchable groups listed above are grouped into sets having about the same molecular weight, then the following sets are obtained:

*Set 1.*—Those having a molecular weight=15–17

(a) The oxygen atom ____ 10 atoms/molecule.
(b) The methyl group ____ 4 groups/molecule.
(c) The amino group ____ 2 groups/molecule.

*Set 2.*—Those having a molecular weight=43

(a) Group A ____ 2 groups/molecule.

*Set. 3.*—Those having a molecular weight=57–58

(a) Group B ____ 2 groups/molecule.
(b) Group C ____ 2 groups/molecule.

*Set 4.*—Those having a molecular weight=91

(a) Group D ____ 2 groups/molecule.

Thus we have—per molecule of Gramacidin:

Channel 1. 16 branches of molecular weight 15–17
Channel 2. 2 branches of molecular weight 43
Channel 3. 4 branches of molecular weight 57–58
Channel 4. 2 branches of molecular weight 91

The amount of energy required to switch a group is directly proportional to its molecular weight. Therefore, Channel 1 groups are more easily switched than Channel 2, 3, or 4, and the read in energy can have a lower quantum energy. Similarly, the other channels are listed in an ascending order of energy requirements. Thus, there is a selectivity or a channelizing within the molecule. It is possible to use four different input frequencies to control each of the four channels listed. Channel 1 has a storage capacity of 16 bits; Channel 2—2 bits; Channel 3—4 bits; and Channel 4—2 bits. If each channel is used as a binary counter in computations, its upper limits will be the number 2 raised to a power equal to the number of possible discrete shifts. The molecule can then be considered a four channel binary counter. Thus a moderately complex molecule provides four separate memories in one microdimensional bit of matter. It can be expected that very complex molecules may provide a considerably larger number of separate channels per molecule and each with a considerably greater bit storage capacity.

Not all of the modes may be allowable from an energy viewpoint but this will only reduce the total capacity by some percentage and does not affect the value of the basic mechanism of multi-bit storage in multi-channel molecules.

Figure 4:
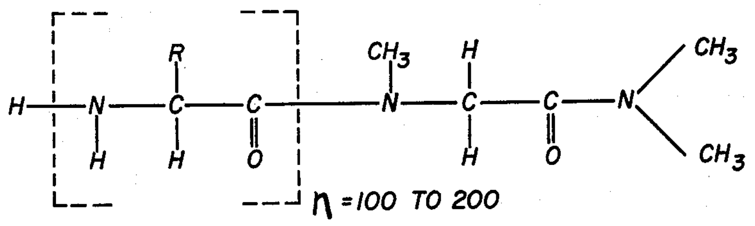
FIG. 4 is a diagram of a polypeptide molecule.

A very important type of molecule whose molecular weight is ten times greater than the Gramicidin molecule is a complex polypeptide molecule with a molecular weight of approximately 10,000, shown in FIG. 4. The group of atoms in brackets is the basic peptide linkage and hundreds of these strung in lengthy chains are found in each polypeptide molecule and each protein molecule. In the molecule shown in the number "*n*" is of the order of 200 and hence it contains 200 peptide groups per molecule. The letter R designates an attached branch radical or group of atoms and a wide variety of such radicals occur in various peptides and proteins.

In this molecule there are only two major groups of different molecular weights that can be shifted in space, the oxygen atom and the R group. Thus, it is a two channel molecule. But the molecule contains 200 switchable oxygen groups and 200 switchable R groups. Thus the polypeptide molecule provides two storage channels per molecule, each channel having a storage capacity of 200 bits. Thus the storage density or memory capacity increases significantly as the molecular weight increases. The peptide chains in proteins can be linear, two dimensional sheets or three dimensional structures. A very wide range of different proteins are known and an almost infinite variety of molecular systems can be expected. The variety arises from variations in:

(1) The number of amino acid residues involved in the make-up of the peptide chain.

(2) The kinds of amino acids involved.

(3) The order in which the various kinds of amino acid residues occur along the polypeptide chains.

(4) The branching of the polypeptide chains.

(5) The configuration of the system due to the folding of the polypeptide chains into various specific configurations permitted by the operation of free rotation about single bonds.

It is sufficient to know that the molecular weights of individual protein molecules ranges from several thousand for the simpler proteins up to ten million for the complex proteins. Each protein molecule will contain large numbers of branch atoms and chains and their positions in space can be altered in discrete steps. The complex protein molecule has the potential for providing very large numbers of storage channels per molecule with a large bit capacity.

The molecular weights of the branch chains in the protein molecule will range from one to about two hundred. When the read in methods enable one to selectively control branch chains which differ in molecular weight by ten units, the range of molecular weights from one to two hundred will allow twenty channels maximum per molecule. The average molecular weight of the amino acid plus peptide group, the basic building block referred to above, is about 120. If the molecular weight of the protein molecule is 5,000,000 then it will contain about 40,000 of these basic building blocks. The basic amino acid plus peptide group will contain on an average about four switchable branch chains (or four storage channels) although it is possible to have the maximum of twenty mentioned above. Each of the four storage channels will have a storage capacity of 40,000 bits. Thus each protein molecule of molecular weight 5,000,000 can have four independent memories each with a storage capacity of 40,000 bits or 160,000 bits per molecule. Even if only 1% of the estimated 40,000 bit storage capacity or 400 bits per molecule are realizable in practice, this will be a considerable breakthrough in memory devices.

Cholestane is essentially a staggered plane molecule while coprostane has one of the end rings (ring A) distorted at 90° to the other rings. Otherwise, both molecules are identical—the difference is only in the space relationships. The effect of this molecular distortion is seen in the infrared spectrum of both types of molecules. Shifts in infrared frequency peaks and changes in amplitude have taken place. The infrared peak at 840 reciprocal centimeters of cholestane, triples in amplitude in coprostane. Similar appreciable changes in amplitude take place at 940; 970; 1,000; 1,060; 1,120; and 1,240. Thus, the distortion of the molecule has altered the energy relationships within the molecule. The infrared spectra of stereoisomers show differences in all physical states since the internal spacial relations in the different states are not the same. The change of cholestane to coprostane is a low energy change and infrared of the correct wave length can induce the shift.

Other examples of multiple states occur in the eight known space configurations of hexose. Shifts can be produced in the hexose molecule and these shifts are reversible. The shift of groups connected to carbon atoms C-1, C-2, and C-4 in hexoses and carbon atom C-3 in a pentose are known. These stereoisomeric shifts are as follows:

*a.* C-1 shift

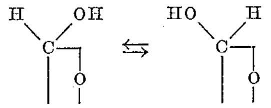

*b.* C-2 shift

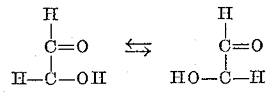

Glucose (as 6-phosphate) Mannose (as 6-phosphate)

*c.* C-3 shift (pentose)

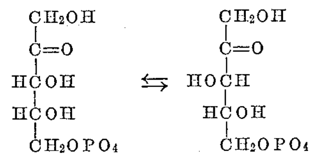

D-Ribulose 5-phosphate D-Xylulose 5-phosphate

*d.* C-4 shift

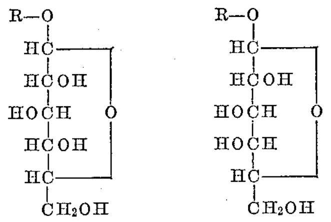

Gulose nucleus Galactose nucleus

In each of the above cases, a rotation of a group about the carbon chain takes place. It is reasonable that the internuclear coupling of the carbon chain can be affected by radiant energy. The effect of radio frequency and direct current fields in nuclear magnetic resonance experiments supports this view.

Besides the stereochemical shifts mentioned above, the conversion of d to l configurations of certain organic molecules may be employed. Thus, d-glutamic acid and d-lactic acid can be converted to l-glutamic acid and l-lactic acid, respectively.

The two known states of cinnamic acid and azo-benzene are other examples of molecular shifts. Significant changes in the infrared spectra take place when the cis-form is induced into the trans-form. These spectral changes in frequency and amplitude are cataloged in standard tables of infrared spectra and nuclear magnetic resonance spectrograms. The changes in state can be followed visually on the oscilloscope of a nuclear magnetic resonance spectroscope or with a scanning infrared spectrometer as a sample of cinnomic acid is irradiated, heated, or cooled. In pure liquids and solutions (and certain solids) total or partial rotation can occur about single bonds and a molecule containing a chain of single bonds may take up innumerable conformations as a result of the coiling and twisting of the chain. This leads to a broadening of the vibration spectrum as each conformation of the molecule is associated with a slightly different system of vibrations.

This effect is shown to advantage by comparison of the liquid and solid phase spectra of the fatty acids. The broadening of the bands is most in evidence in the region of the C—C skeletal vibrations between 1200 and 800 reciprocal centimeters. In cyclic compounds the possibilities for labile isomerism are limited to rotational isomerism in side chains or ring deformations such as the boat-chair inversion in cyclohexane.

The state of a molecular aggregate can be controlled by bursts of visible, infrared, or ultraviolet light or even X and gamma rays. Such techniques are in common use to convert inert organic molecules into free radicals. This photo-chemical technique is referred to as flash photolysis and is enlarged on in the discussion on read in techniques.

Nuclear magnetic resonance techniques also are feasible for the control of molecular states. By use of a direct current magnetic field and a radio frequency field it is possible to couple energy to any desired atom in a molecule. This can be done to large numbers of molecules in a physically realizable sample of material.

The change in molecular states must be a reversible phenomenon. One example that can be cited is 1,2-dichloroethane. Its infrared spectrum actually consists of two superposed spectra of its two possible states (cis and trans). If thermal energy is removed from the system by cooling, one of the spectra fades out leaving the pure spectrum of the other states. Thus, one of the states is converted into the other state. In the case of 1,2-dichloroethane the cis-form is converted into the trans-form. At higher temperatures, energy is absorbed and a larger number of trans molecules become converted into the cis-form. The cisspectrum reappears and the transspectrum declines. The absorption of infrared produces the same effect of shifting the trans into the cis-form. Reducing the temperature reverses the process.

Other examples exist that show similar reversible effects including azo-benzene; cinnamic acid; 1,2-dibromoethane; 1,1,2,2-tetrachloroethane and others.

The total energy content of molecules consists of electronic, rotational, and vibrational energies. The thermal rotational and vibrational energies tend to reconvert the meta-stable molecular states back to their original state, thereby degenerating the storage and masking detection. Of course, this is true of any type of storage including the magnetic core storage in use now. Naturally, the decay of the meta-stable states over a period of time must be taken into account as it is in magnetic storage. The stability of the meta-stable states must be such that storage will be maintained for as long a period of time as is desired.

The thermal energy can be reduced by cooling if desired and its destructive effects eliminated. But actually the thermal energy does not produce any particularly serious masking effects. For example, the infrared spectrum of linoleic acid at 30° C. differs from that at −195° C. Cooling the sample to such a degree produces a sharpening of the major peaks and brings out a series of minor peaks. But the major peaks are quite readily identifiable at 30° C. despite the thermal energy of the molecules. The fact that the sample at 30° C. is in the liquid state and the sample at −195° C. is a solid state, does not have any effect on the spectra. Thus, the large number of molecules in the sample and the statistical distributions of energy in the sample will not cause any serious difficulty in read in or detection.

In a small sample containing one microgram of a material with a molecular weight of 10,000, there are approximately 60,000 billion molecules. They are arranged randomly in a tangled mass of non-oriented molecules. A larger amount of energy is required to produce the desired molecular shifts in a disoriented mass because the coupling efficiency depends on the orientation of each molecule with respect to a polarization axis of the read in energy. The shifts or changes in the material may also be somewhat less sharp and channel resolution may be somewhat degenerated. The molecular switching effect is much more effective if the molecules are not randomly oriented but are ordered in a definitely known configuration with respect to each other. Coupling to the molecules, and channel resolution is greatly improved if all of the molecules are aligned in the same direction forming a uniform matrix. Such alignment of molecules is possible and this technique is used commercially in synthetic Polaroid film which consists of a sheet of quinine iodosulfate molecules whose axes are aligned electrostatically in a regular lattice pattern. Thus the physical form of the material has an important bearing on the read in and readout methods, coupling efficiency, and channel resolution.

A molecule in a crystalline material is in a potential field formed by the surrounding molecules. The positions of the molecules with respect to each other can result in neutralization or enhancement of mutual electric fields and a sort of equilibrium is established. The alignment of the molecules along the same axis can provide a strong enhancement of the fields with an improvement in the effects of read in energy. Thus the material in its molecular state is a three-dimensional array of electronic charges held in a certain kind of balance. The technique for upsetting this balance and changing the material into another meta-stable form is analogous to the technique of ionization of single atoms. Energy is absorbed by atoms in discrete amounts and the absorption raises the energy level of an orbiting electron or spinning nucleus to a high level. Many intermediate energy levels are possible before full ionization takes place. Molecules can also absorb discrete amounts of energy and their total potential energy is raised. It is well known that such energy changes can be produced by heat or light energy, and similar energy changes can be achieved by the effects of controlled electrostatic, magnetic, or radio frequency fields on the stability of a molecular structure.

The read in energy must be capable of affecting certain atomic groupings or branch chains, selectively. The branch chains consist of various arrangements of interconnected carbon atoms bearing hydrogen, carbon plus nitrogen chains, chlorine atoms, bromine atoms, carbon plus oxygen radicals, and many other groupings. These branch chains will have a net average electric charge which will be the resultant of the positive and negative charges of the atoms in the branch chain. Thus a group can be electro-negative or electro-positive. To a certain degree, the magnitude of these net charges can be estimated and an ascending electro-negative or electro-positive series can be obtained which places the many atomic groups on a potential scale. It is possible for an electrostatic field of a certain magnitude and polarization to selectively affect specific branch chains only depending on their position on this potential scale. Similarly, a magnetic field can be suitable for switching branch chains selectively. It is well known that electric and magnetic fields have important effects on the internal structure of molecules and have been used to determine the structure of molecules. Electric and magnetic fields have the ability to exert a torque on branch chains and these fields can be successfully employed for read in purposes.

Since the shifting of branch chains is a molecular switching operation, it follows that unidirectional energy fields are most effective for read in techniques. But the effects of radio frequency fields are also effective. The materials to be employed for molecular storage are unsymmetrical and have electric dipole moments. Such molecules, under the influence of electric fields, become polarized to a certain degree. The total polarization will be made up of several components. The total molecular polarization consists of;

(1) The electronic polarization which is that part produced by the shifting of the electrons in the atoms of the molecule with respect to the nuclei of the atoms.

(2) The "atomic" polarization caused by the fact that the distance between two atoms can be made larger or smaller by means of an electric field.

(3) The polarization produced by orientation of the entire molecular dipole.

Figure 5:
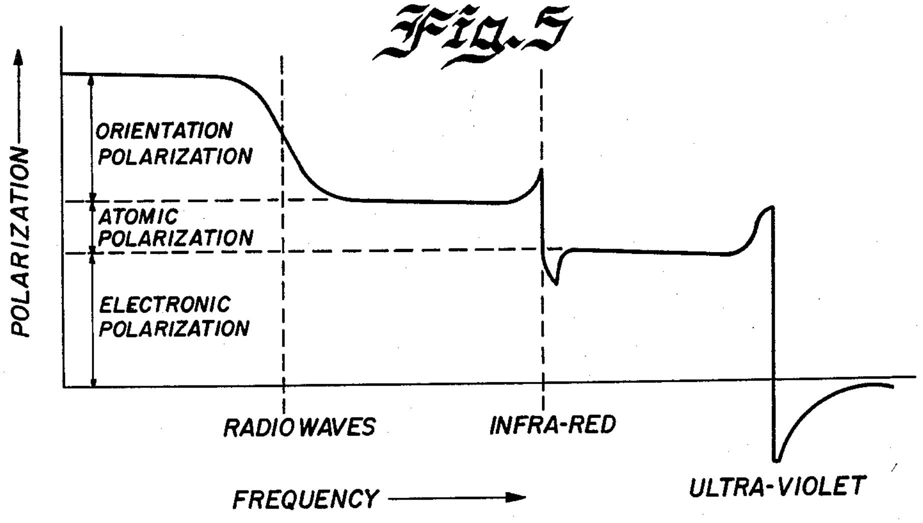
FIG. 5 is a graph showing the polarization of unsymmetrical molecules in an alternating electrical field.

If a high frequency alternating current field is applied to an unsymmetrical molecule, the polarization will vary with frequency as shown in FIG. 5. Normally, the polarization or dielectric constant is measured at low frequencies, i.e. at the left-hand side of FIG. 5. As the frequency increases, there is a region where the molecular dipoles are no longer able to follow the field and the polarization decreases. As the frequency is raised further, the atomic polarization also disappears. At ultraviolet ray frequencies, the electrons also are not able to follow the fields and their contribution to the polarization is also lost. The atomic polarization is usually lost at infrared frequencies and the electronic polarization in the ultraviolet range. The polarization curve takes an unusual form at infrared and ultraviolet frequencies and internal molecular changes take place. These infrared and ultraviolet regions happen to be absorption regions for a large number of materials.

The read in techniques discussed above are based on the creation of a molecular distorting or bending torque through the interaction of an energy field and the residual electric charge of branch chains. The same torque can be producible by unorthodox means not usually associated with electric circuits. For example, an excellent technique for reaching directly into each molecule of a material is to suspend it in a suitable liquid. This technique is called "fluid coupling." It is possible to control the shift of branch chains by surrounding the molecule with an electrolyte containing ions of appropriate charge density and allowing their electric fields to interact. Different ions have different mobilities in a fluid and this difference can be the basis for selective effects in molecules.

The basic problem in read in technique is to find a method whereby a form of energy acts on our sample of molecules and converts a significant portion into a metastable state. The form that the energy will have to take will depend on the size of the molecules and the molecular weight of the group being shifted. The energy to perform such a change in state may be high energy radiation such as ultraviolet or visible light or lower energy radiation such as infrared, microwave, or even radio frequency and direct current fields. The type of energy required will be determined by the design of the molecular system used.

Photochemical reactions, of course, are well known. It is possible to use pulses of high energy radiation such as X-rays and gamma rays to excite atoms and molecules, but a multiplicity of ionized states results. Experimental photochemical excitation of molecules has been quite successful using ultraviolet and visible light. This technique is called flash photolysis. Condenser discharges are used to produce pulses of ultraviolet or visible light of the order of microseconds. The first pulse is passed through the sample and produces excitation of the molecules. Then a second pulse of energy of smaller amplitude is passed through the sample about 30 microseconds after the first pulse. The second pulse is passed through a spectrometer and the spectrum is used to identify the molecular states. The photochemical efficiency of this reaction is about 10% which gives a satisfactory concentration of the meta-stable states for reliable detection. The technique of flash photolysis to produce photochemical changes of state shows that visible radiation is applicable as read in energy. Actually, this technique produces too great a molecular change and causes large amounts of ionization of the sample. But use of lower energy radiations like the red, ultraviolet, or microwave end of the spectrum eliminates the ionization products and produces low energy stereochemical changes of state. The basic technique of shifting groups or radicals requires low energy pulses and infrared, microwave pulses, or lower radio frequency pulses are the most effective forms of energy for molecular read in.

The process of read in requires a technique capable of reaching into a molecule and adding or subtracting energy to particular nuclei in particular branch chains. Under certain conditions, radio frequency energy in the range from one megacycle to about sixty megacycles can act directly on almost any desired nucleus in a molecule. The proper radio frequency in the presence of a direct current magnetic field can cause molecular nuclei to absorb energy and change state. This technique is called nuclear magnetic resonance. It is used to determine the behavior of nuclei in molecules and the structure of molecules in space. Usually the applied radio frequency field is held constant and the direct current magnetic field is varied over a small range until the proper resonant condition is reached. The same nucleus in different chemical groups gives rise to slightly different resonances. For example, the hydrogen nuclei in a methylene group ($CH_2$) will require a slightly different radio frequency than the hydrogens in a methyl group ($CH_3$). Thus, although the hydrogens in both of these cases are absorbing radio frequency energy, their magnetic environment is slightly different and the resonant conditions differ. Thus, one can selectively attack the $CH_2$ group or the $CH_3$ group. To act on several nuclei in a branch chain simultaneously, a constant direct current field is applied and several different radio frequencies are applied. In this manner an entire complex radical can be resonated and energy introduced. The radio frequency powers required are appreciably higher than those used in nuclear magnetic resonance spectrographic analysis. Of course, it is also feasible to apply a set of radio frequencies in a direct current magnetic field and vary the strength of the direct current field to obtain the correct resonance condition for selected groups. A train of pulses of the correct amplitude can be employed to increase or decrease the total magnetic field to achieve resonance absorptiion from a mixture of radio frequencies. The amplitudes are designed to excite the desired group of nuclei and the pulse length selected to produce the correct exposure to the fields for energy absorption.

In summarizing the read in problem, it is seen that a number of approaches are feasible. Infrared and microwave absorption techniques are quite feasible. But the most effective organic molecular read in technique is the use of controlled nuclear resonance using direct current magnetic fields and radio frequency signals in the range from one megacycle to sixty megacycles.

In addition to being able to read in desired data and instructions it is necessary to be able to locate and read out stored data or read out the results of the digital computation. A readout technique must give an accurate picture of the changes of state that are taking place in the molecules and the immediate state of the molecules. The read out techniques must be capable of handling large numbers of channels simultaneously and at high speeds.

The basic problem in molecular read out is the development of a method which can detect the shift of a branch chain in a molecule. This method must be sensitive enough to detect the discrete movement of the lowest molecular weight group employed. Methods in common use in physicochemical studies make it possible to detect the shift of even one hydrogen atom in a molecule.

In general, a given material will have a characteristic absorption spectrum in the infrared, ultraviolet, visible light, and/or microwave frequency ranges. When a branch chain shifts its position in the molecule, the peaks in the absorption spectrum shift in frequency and their amplitudes may also change. The frequency and amplitude distributions in the spectrum are characteristic for each molecular spacial configuration. Thus by correlation of the spectra before and after a shift it is possible to identify the branch chain that changed position. The magnitude of the spectral shift and their frequencies are functions of the molecular weight of the branch chain.

The most important effects are found in the infrared absorption spectra of materials. A considerable amount of work has been done in cataloging the absorption frequencies and relative amplitudes of a very large number of materials and different molecular spacial configurations. The value of infrared as a tool for determining changes in the structure of a molecule has been established. The most noteworthy applications of infrared investigations to large molecules are the use of polarized infrared radiation. For by controlling the direction of polarization relative to the crystal, one can trace the directions in which, for example, most of the bonds of a protein are oriented. One can distinguish between folded and extended protein chains. The absorption of radiation is highly specific to certain bonds and in this way one has a kind of "probe" that can penetrate easily into the system, by-passing groups of atoms in which one is not interested and telling one about the orientation of bonds and atoms that would otherwise be inaccessible. It is seen that multi-channel read out is a possibility and is one approach to a solution. Special multi-channel infrared sensing heads convert the infrared frequencies into electrical impulses. These infrared sensors have special narrow band widths either through the use of filters or through the chemical nature of the material.

The "probe" frequency is a function of the molecular weight of the branch chain undergoing a shift in its relative space position. With large, heavy, branch chains such as the benzene group, the probe frequencies fall in the microwave range. The use of microwave absorption spectra as a measure of the changes taking place in molecules is possible but less convenient than the infrared technique. A rapidly tunable swept microwave receiver is employed to sweep through the absorption frequency range of the material. The use of carcinotron tubes and traveling wave tubes allows microwave sweeps over ranges of one octave in sweep times of microseconds. The outputs of successive sweeps can be auto-correlated to determine the shifts of branch chains simultaneously in multiple channels. This technique results in a breadboard readout system.

For a multi-channel computer with several thousands of channels, the readout circuits may contain several thousand channels. This multi-channel readout effect is obtained by making use of the fact that the channels differ from each other in the assigned molecular weight of the branch chains. Each channel differs from the next channel in the same molecule by about ten molecular weight units. Then each channel can be read out only by certain unique frequencies specific to that channel. Thus the same broad band infrared input can serve as a multi-channel readout for a large number of channels. In this manner it is possible to simplify the system to an appreciable degree.

In multi-channel readout techniques sets of discrete infrared frequencies are used as carrier or probe frequencies. Specific infrared frequencies service individual computer channels. Microwave energy can be propagated, with very little loss, in thin layers of dielectric materials. The dielectric is deposited on a wire to provide physical support but the wire has no part in the transmission of the microwave energy. This type of propagation is called surface wave transmission and is commonly known as G-line transmission after its discoverer. Since infrared is essentially microwave energy, propagation of broad band infrared as a surface wave in thin dielectric layers is possible. Infrared can be propagated in thin filaments of dielectric and a single filament may carry several hundred infrared computer read out channels.

Infrared and microwave absorption spectra are not the only read out means available. Changes in molecular structure can produce many phenomena that can be adapted to read out purposes. Polarized light undergoes a certain amount of rotation of the plane of polarization on being passed through optically active materials. Molecular shifts will shift the plane of polarization on being passed through optically active materials. Molecular shifts will shift the plane of polarization different amounts depending on the material. Discrete visible frequencies, when scattered from molecules, will show a spectrum containing new frequency components.

The infrared and microwave spectra techniques are valuable and quite feasible, but a more powerful readout tool can be found in nuclear magnetic resonance spectra. Nuclear magnetic resonance is a technique which has been known for possibly a decade and shows promise of becoming a widely used technique for determining the space configuration of molecules. Thus, nuclear magnetic resonance spectrograms can provide a fingerprint identifying particular meta-stable states of the sample material. It can not only identify specific types of organic radicals or groups in a molecule, but enables one to follow the history of a particular group as it is subjected to read in excitation. It is necessary to determine the connection between the space structure of an organic molecule and its nuclear magnetic resonance spectrum in order to employ nuclear magnetic resonance techniques for readout of molecular storage.

In the discussion of nuclear magnetic resonance, the term "nuclei" means specifically the nucleus of chemical atoms without referring to their orbital electrons. In dealing with organic molecules, the nuclei that are of interest primarily are carbon, hydrogen, oxygen, nitrogen, sulfur, and a few others. The nuclei of these atoms possess different amounts of positive charge dependent on their position in the Periodic Table. In nuclear magnetic resonance, one is concerned primarily with the effects of intense magnetic fields and high frequency radio frequency fields on the positively charged nuclei.

The concept today of the nucleus is that it is not a point charge, but that it is a spherical or ellipsoidal particle with a certain surface area. Several different types of nuclei are known and these can be cataloged as follows:

(1) *Non-spinning nuclei.*—Certain nuclei have their charge distributed uniformly and act as if they were non-spinning spheres. The non-spinning nucleus does not have a magnetic moment and is not affected by radio frequency or direct current fields. Therefore, it does not give a nuclear magnetic resonance spectrum and one should not be concerned with these types.

(2) *Symmetric spinning top nuclei.*—Many nuclei behave as spherical spinning bodies with a uniform distribution of their positive charges over the spherical surface and are referred to as symmetric tops. The spinning nucleus with its circulating charge has a magnetic charge or a magnetic field associated with it so each nucleus is a very tiny magnet. Hydrogen, and isotopes of carbon and nitrogen possess nuclei of this type.

(3) *Non-spherical spinning top nuclei.*—Many atoms possess nuclei which are magnetic spinning tops, but whose positive charges are not evenly distributed. Such nuclei are considered non-spherical or ellipsoids spinning about the principal axis. Deuterium (heavy hydrogen) and nitrogen 14 are examples of asymmetric spinning tops. The ellipsoidal type of nucleus can be broken down further into prolate or oblate spinning nuclei.

In this invention one is concerned only with those atoms possessing nucei that have circulating charges and will select meta-stable materials containing spinning nuclei in those branch chains that one wishes to shift. In this manner, one can trace the behavior of molecular branch chains by acting on these nuclei with a direct current and a radio frequency field and studying the nuclear magnetic resonance spectrogram. Thus, coupling to the nucleus tells what the branch chain is doing.

Figure 6:
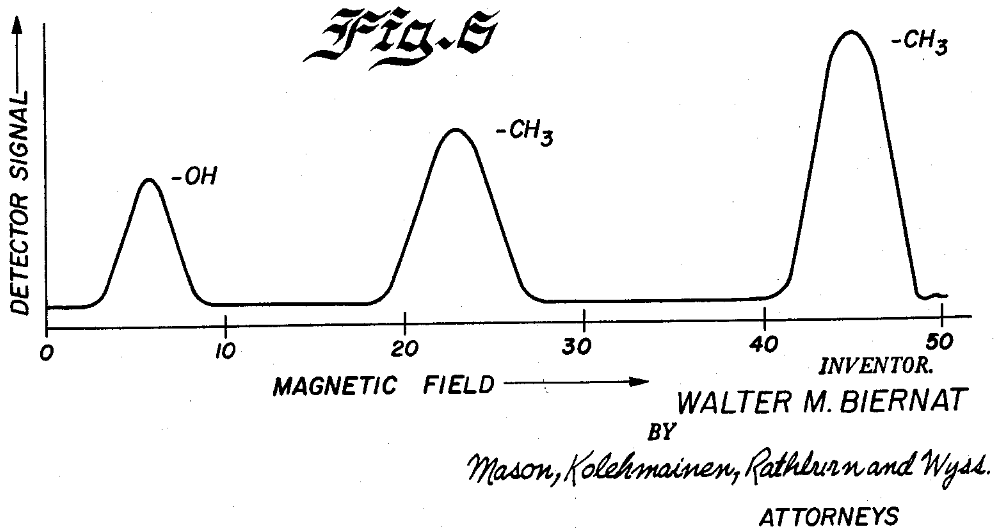
FIG. 6 is a graph showing a low-resolution nuclear magnetic resonance spectrogram of ethanol protons (hydrogen nuclei) at 40 megacycles and 9400 gauss.

The nucleus behaves as a small magnet. In other words, the nucleus has a certain magnetic moment associated with it. The magnetic moment is a vector quantity, having magnitude and direction, and appears to have only certain specific average values in any given direction. The nuclear magnetic moment can only have certain discrete values of quanta. Generally, the value of this moment is expressed in a magnetic quantum number which is a function of the nuclear spin and the direction of the applied magnetic field. In general, spinning tops can have two magnetic quantum numbers and a given mass of material has equal amounts of nuclei with both quantum numbers. In the absence of a magnetic field, there is no preference for either of these two possible magnetic quantum numbers and there are equal numbers of both in a large physical aggregate or a thin film of material. However, in a magnetic field there is a tendency for the nuclei to align themselves with the field which means a tendency for the nuclei to assume the more favorable energy state or the more favorable quantum number. Thus, the equilibrium shifts in one direction. Thus, nuclear magnetic resonance concerns itself with transitions of nuclei in a magnetic field between different energy levels identified by different quantum numbers. These changes of state of the nuclei from one magnetic quantum state to another magnetic quantum state can also be related to digital storage. The interest in nuclear magnetic resonance is that the transition from one magnetic quantum state to another tells what is happening to that particular branch chain with respect to the entire molecule. Thus, the magnetic properties of spinning nuclei give information about whether or not the shift of a group has taken place, and to identify the new space structure of the molecule. The nuclear magnetic resonance technique is being used here for readout only and not as part of the read in mechanism. FIG. 6 shows a low resolution nuclear magnetic resonance spectrogram of ethyl alcohol (ethanol). The receiver detector output is plotted against direct current magnetic field strength with the radio frequency held constant at forty megacycles. The same spectrogram is obtained by keeping the magnetic field fixed at a certain value and sweeping the radio frequency over a certain bandwidth. This particular spectrogram is a proton or hydrogen resonance spectrum. But in the ethyl alcohol molecule, hydrogen occurs in three different radicals; namely, methyl ($CH_3$), methylene ($CH_2$), and hydroxyl (OH). In each of these different groupings, the hydrogens have different proton resonances and each group forms a separate peak in the nuclear magnetic resonance spectrum. Thus, each group can be associated with specific peaks and these are identified in FIG. 6. With a higher resolution spectrogram the peaks show a hyperfine structure and individual hydrogen atoms exhibit resonance peaks. Thus, the nuclear magnetic resonance technique is quite selective and it is possible to monitor individual atoms or groups in a molecule. Within a molecule there exist internuclear coupling forces even though the nuclei are separated by other nuclei. When such spin-spin coupling takes place, the result in the nuclear magnetic resonance spectrogram is the splitting of a line into several lines. The conditions for nuclear resonance change. Spin-spin couplings are powerfully influenced by molecular geometry. A cis-to-trans shift will alter the nuclear coupling effects and produce frequency shifts in the nuclear magnetic resonance spectrum. Thus, changes in the molecular space configuration by shifting molecular groups can be readily read out by nuclear magnetic resonance spectroscopy. The nuclear magnetic resonance spectrogram can be displayed on an oscilloscope and molecular structural changes can be viewed as they take place. Photoelectric sensors can be used to detect the shifts of nuclear magnetic resonance spectral lines and the impulses converted into a binary digital code if desired. Or the radio frequency absorption frequencies or the amplitude of the magnetic field can be used as analogs of the molecular shift and converted into digital form.

It must be pointed out that this read out technique is non-destructive. The nuclear magnetic resonance technique causes a small absorption of energy and produces nuclear vibration. The energy level is such that there is no distortion or change in the molecular structure. In the read in discussion above, it was pointed out that this same nuclear magnetic resonance technique could be used to cause a shift of a molecular group. But the energy level required will be several magnitudes greater than the read out process requires. Thus, it is possible to combine read in sweeps and read out sweeps by a simple control of the radio frequency power level. A higher power frequency modulated, radio frequency read in input can be followed by the second similar sweep at lower power to readout the new state of the molecules. Thus, read in and readout can be programmed in any desired sequence and within microseconds if desired.

Figures 7, 8, 9:
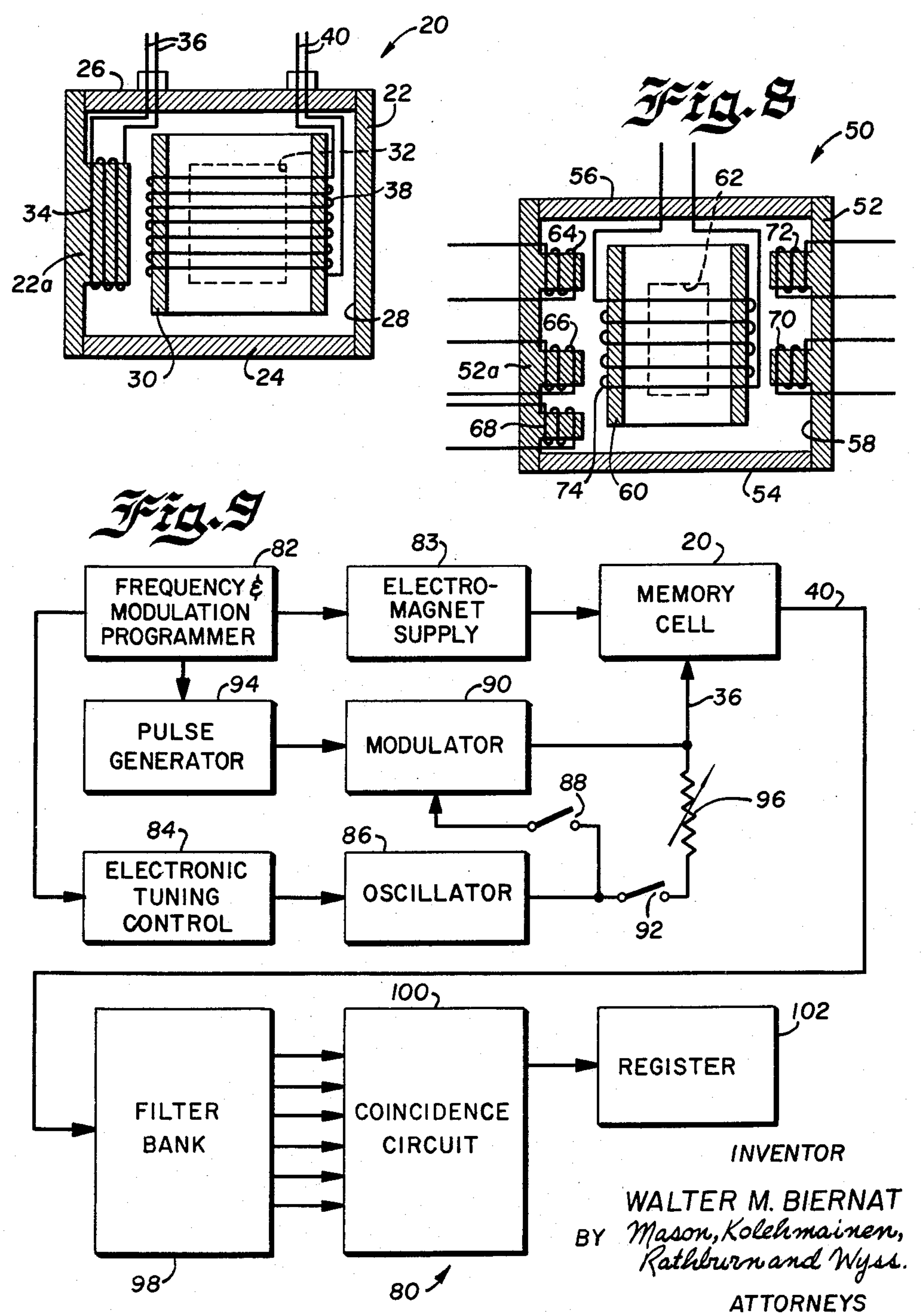
FIG. 7 is a sectional view of an elemental molecular storage unit.
FIG. 8 is a sectional view of a plural bit molecular storage unit.
FIG. 9 is a block diagram of a circuit for storing data in and removing data from a molecular storage unit.

An illustrative embodiment of a storage unit or memory cell 20 is illustrated in FIG. 7 of the drawings. The cell 20 includes a cylindrical or rectangular enclosure or housing 22 that is closed by a bottom plate 24 and a top plate 26 to form a cavity 28. A receptacle 30 positioned within the cavity 28 contains a body 32 of the storage material. This material can comprise either one that can be arranged in at least two different structural states or one that includes a plurality of atoms or groups of atoms that can each be distorted to at least two different structural states.

To provide a means for storing a single data bit in the body 32, the memory cell 20 includes a coil 34 disposed adjacent the receptacle 30 and mounted on a projecting portion 22*a* on the inner surface of one wall of the housing 22. A pair of input leads 36 for the coil 34 are adapted to be connected to a source of alternating current voltage. Suitable magnetic biasing means comprising either a permanent magnet or an electromagnet (not shown) are positioned adjacent the housing for the storage unit 20 to provide a magnetic biasing field for the body 32 of a fixed or controllable intensity. Thus, the magnetic biasing means and the coil 34 provide means for applying energy to or stressing the body 32 so that its molecular structure can be shifted or distorted to one or the other of two states in dependence upon whether a data bit is to be stored. If a plural bit entry is to be stored, the body 32 includes a plurality of molecular structures that can be arranged, and the coil 34 and magnetic biasing means are energized to sequentially apply fields of different characteristics for each structure to be distorted.

To provide means for reading out or recovering the data bit stored in the body 32, the receptacle 30 supports a coil 38 having a pair of input conductors 40 connected to a frequency responsive detecting means. The coil 38 is disposed substantially at a right angle to the coil 34. Thus, when the body 32 is stressed or energized by a combined magnetic and electromagnetic field, the coil 38 is energized by radiant energy emitted from the body 32 to provide a signal representing the molecular structure of the body 32.

FIG. 8 illustrates another type of storage or memory unit 50 that is particularly useful in storing a plural bit data entry. The memory unit 50 includes a housing or enclosure 52 closed by a bottom plate 54 and a top plate 56 to define a cavity 58. A receptacle 60 disposed in the cavity 58 contains a body 62 of material having a plurality of atoms or groups of atoms that are each operable to at least two discrete structural arrangements. The memory unit 50 can be operated to store a plural bit data item by shifting the structural arrangements of the different atoms or groups of atoms to provide a pattern of structural arrangements representing the stored plural bit entry.

To provide means for storing a plural bit data item in the cell 50, the body 62 of material is subjected to a fixed or controlled magnetic field by permanent or electromagnetic biasing means (not shown). In order to apply a controlled alternating current field to the body 62, a plurality of coils 64, 66, 68, 70 and 72 are provided which are connected to external signal generating means and which are supported on inwardly extending projections 52*a* on the inner surface of the housing 52. By applying different combinations of magnetic and alternating current stresses or fields to the body 62, the structural arrangements of the plurality of atoms or groups of atoms are shifted in accordance with the different bits of the plural bit entry to be stored.

To provide means for reading out or recovering the entry stored in the body 62, a coil 74 is disposed about the receptacle 60 in a position extending substantially transverse to the coils 64, 66, 68, 70 and 72. When the body 62 is subjected to combined magnetic and electromagnetic fields of different characteristics, the plurality of atoms or groups of atoms in the body 62 cause the emission of different radiant energies characteristic of the pattern of structural arrangements. These signals are coupled to a detecting means by the coil 74 to provide an indication of the plural bit entry stored in the body 62.

FIG. 9 of the drawings illustrates a typical circuit 80 that can be used to store a plural bit entry in the memory cell 20. This cell is provided with a body 32 of material including a plurality of atoms or groups of atoms that can be individually arranged in a plurality of different structural arrangements by the application of combined magnetic and alternating current fields of different characteristics. In the circuit 80, the structural arrangement of each of the plurality of atoms or groups of atoms is controlled by applying a constant magnetic bias to the material and by changing the frequency of the energy applied to the coil 34.

When a plural bit data entry is to be stored in the memory cell 20, a frequency and modulation program control unit 82 is provided with the plural bit data item that is to be stored in the cell 20. The unit 82 controls an electromagnet supply unit 83 so that a fixed magnetic bias is supplied to the material 32 in the memory cell 20. However, if desired, the unit 82 can control the unit 83 so that a variable magnetic bias is applied to the material 32 to control the response of the plurality of atoms or groups of atoms in the body 32. The electromagnet supply unit 83 can comprise a variable, regulated direct current voltage supply circuit, such as a Model 610B unit manufactured and sold by the Beta Division of Sorensen & Co.

The unit 82 also controls an electronic tuning control 84 to cause an oscillator 86 to generate alternating current signals having a frequency varying over a range including all of the frequencies to which the atoms or groups of atoms in the body 32 respond. The output of the oscillator 86 is forwarded through a closed switch 88 to a modulator 90 during data storing operations. A switch 92 is opened during the storing operation so that the output of the oscillator 86 is not applied directly to the coil 34 of the memory cell 20. The output of the modulator 90 is connected to the coil 34 of the memory cell or storage unit 20 over the conductors 36. The components 86 and 90 can comprise a Heulett Packard Model 608 signal generator or a Spencer-Kennedy Model 214B generator used with a Spencer-Kennedy Model 206 amplifier.

When the plural bit data item has been supplied to the frequency and modulation program unit 82, the electromagnet supply 83 is enabled so that the body 32 of material is stressed by the application of a magnetic field, and the electronic tuning control 84 is placed in operation so that the oscillator 86 is swept over the desired range of frequencies. If the data item is, for example, provided in a binary form comprising a combination or permutation of binary "1" and "0" bits, the unit 82 controls a pulse generator 94 to provide an enabling signal at each point in the frequency sweep of the oscillator 86 that corresponds to the response frequency of an atom or group of atoms that is to be shifted to an alternate structural state to represent a binary "1," for instance. The pulse generator 94 can comprise a Berkeley Model 4904 generator. Thus, the output of the modulator 90 is modulated to apply bursts of alternating current energy of different frequencies to the coil 34 corresponding to the different binary "1's" that are to be stored. These discrete fields distort selected ones of the plurality of atoms or groups of atoms in the body 32 from one structural arrangement to another structural arrangement. At the conclusion of one or more cycles of operation of the oscillator 86, the unit 82 automatically terminates the operation of the system. At this time, the combination, permutation or pattern of structural arrangements in the plurality of atoms or groups of atoms in the body 32 effectively stores the entered data item in a form corresponding to the pattern of binary "1's" and the binary "0's" in the original entry.

To read out the plural bit entry stored in the body 32 without destroying this storage, the nuclear magnetic resonant phenomenon is utilized. Each of the structural arrangements or states to which each of the atoms or groups of atoms can be shifted or distorted exhibits a particular nuclear magnetic resonant frequency. Accordingly, if the body 32 is subjected to or excited by a combined magnetic and alternating current field, the body 32 radiates signals at given frequencies that correspond to the different structural states of the atoms or groups of atoms then existing in the body 32. The pattern of radiated energy emitted from the body 32 thus provides a means of detecting the stored plural bit entry without altering the existing pattern of structural arrangements.

To initiate a data readout operation, the switch 88 is opened and the switch 92 is closed so that the output of the oscillator 86 is connected to the coil 34 through a variable impedance device 96. When the unit 82 is placed in operation, the unit 83 magnetically biases the body 32 and the electronic tuning control 84 actuates the oscillator 86 so that an alternating current signal is generated that passes over a frequency range including all of the nuclear magnetic resonant frequencies of all of the atoms or groups of atoms in the body 32. The variable impedance device 96 is adjusted so that the level of energy applied to the coil 34 during the readout operation is substantially less than the energy applied by the modulator 90 during the storage operation. This prevents any substantial alteration in the structural arrangements in the body 32 while providing sufficient excitation for the body 32 to produce the emission of radiant energy used to detect the stored entry.

The output coil 38 in the memory unit 20 is connected over the conductors 40 to the input of a filter bank 98 that includes a plurality of band-pass filter channels corresponding to the different nuclear magnetic resonant frequencies of all of the plurality of atoms or groups of atoms. The output of the filter bank 98 is supplied to a coincidence circuit 100. The body of material 32 emits radiant energy of frequencies corresponding to the nuclear magnetic resonant frequencies of the plurality of atoms or groups of atoms in the pattern of structural arrangements to which they have been operated during the storage operation. Thus, the channels in the filter bank 98 supply signals to the coincidence circuit 100 representing the pattern of structural arrangements in the body 32. The coincidence circuit 100 compares the received signals with the absence of other signals and supplies an output signal to a register 102 to store the plural bit entry. The entry stored in the register 102 can be supplied to any desired data utilizing means. If desired, the output from the coil 38 can be forwarded through a receiver, such as a Collins Radio Model 51J receiver, to an oscilloscope, such as a Tektronics Type 511A, to provide a visual display of the stored data item.

Although the circuit 80 illustrated in FIG. 9 is described as sequentially applying different alternating current signals to the body 32 with a constant magnetic bias supplied to this material, it is obvious that a fixed alternating current bias can be applied to this material and the entry of the various bits of information into the body 32 can be accomplished by controlling the electromagnet supply 83 to supply magnetic fields of different intensities and characteristics. Further, a plural bit entry can be stored in the body 32 by using the memory cell or storage cell 50 illustrated in FIG. 8 which permits the concurrent application of different frequency alternating current signals to each of the plurality of coils 64, 66, 68, 70 and 72 rather than the sequential application of the alternating current signals to the coil 34 under the control of the pulse generator 94. In addition, it is apparent that if the storage unit 20 includes a body 32 of material having a molecular structure that is shiftable between only two states, a single bit of information can be stored in the cell 20 merely applying or not applying a proper combined field of magnetic and alternating current energy in accordance with the necessity of storing either a binary "1" or a binary "0." In the illustrative example set forth above, the operation of the memory cell 20 to store a data entry in a binary form is described. However, the ability of a single atom or group of atoms or a plurality of atoms or groups of atoms to be arranged in more than one discrete structural arrangement obviously facilitates the storage of data in decimal, bi-quinary or other forms.

Although the present invention has been described with reference to a number of embodiments thereof, it should be understood that many other modifications and embodiments can be made by those skilled in the art that will fall within the spirit and scope of the principles of this invention.

What is claimed and desired to be secured by Letters Patent of the United States is:

1. A passive unit for storing plural bit entries comprising a mass of material including a plurality of different groups of atoms, each of said groups being shiftable between different structural arrangements in response to applied energy of a given frequency, each of said structural arrangements being characterized by a response at a known frequency, an energy source including components of all of the given frequencies to which said groups of atoms are responsive, input means connected to said energy source for controlling the application to said material of energy of selected ones of said given frequencies to shift the structural arrangements of said groups of atoms to a pattern representing a plural bit entry, frequency responsive output means coupled to said mass of material for providing an indication of the plural bit entry stored in the mass of material in accordance with energy received from said mass of material, and means for applying energy to said material including components of all of said known frequencies to selectively energize said output means in accordance with the structural arrangements of the plurality of groups of atoms.

2. A passive unit for storing a plural bit data item comprising a mass of material including a plurality of groups of atoms shiftable to different structural arrangements in response to the application of magnetic and alternating current fields to said material, said different structural arrangements each having a distinct nuclear magnetic resonant frequency; data entering means including means for applying a combination of magnetic and alternating current fields to said mass of material to shift the plurality of groups of atoms to a pattern of structural arrangements representing an entered data item; frequency responsive output means coupled to said mass of material and responsive to energy received from said material for providing an indication of the data item stored in said material; and readout means including means for applying energy including components of all of said nuclear magnetic resonant frequencies to said mass of material to cause the transfer of said stored data item to said output means.

3. An apparatus for storing plural bit data items in a mass of material containing a plurality of groups of atoms each shiftable between at least two different structural arrangements, said material being capable of radiating energy unique to the existing structural arrangement when excited by received energy, comprising input means for applying a combination of different radiant energies to said material in accordance with a plural bit data item to be stored so as to operate the plurality of groups of atoms to a pattern of shifted and unshifted structural arrangements representing the stored plural bit item, readout means for applying a readout radiant energy to said material, and indicating means for receiving the energy radiated from said material due to the application of said readout radiant energy to said material and for translating the received radiated energy to a form providing an indication of the stored item.

4. An apparatus for storing a plural bit data entry in a mass of material that includes a number of different groups of atoms that is at least as large as the number of bits in the plural bit entry, each of said groups of atoms being shiftable to at least different first and second structural arrangements, comprising input means for selectively stressing a number of groups of atoms in said material that is equal to the number of bits in the data entry to selectively shift the structural arrangement of each of the stressed groups of atoms to a selected one of said first and second structural arrangements so that said stressed groups of atoms presents a pattern of first and second structural arrangements corresponding to the stored plural bit entry, readout means for applying energy to the mass of material to cause the material to radiate energy having a pattern of unique characteristics corresponding to the pattern of structural arrangements of the stressed groups of atoms, and indicating means controlled by the unique characteristics of the energy radiated by the mass of material for providing an indication of the plural bit data item stored in the material.

5. A data storage unit for storing a plural bit data item comprising a mass of material having a plurality of groups of atoms each operable to at least two different molecular structures, each of said groups of atoms being operable to a second one of said molecular structures from a first one of said molecular structure in response to received radiant energy of a given frequency, a plurality of input means corresponding in number to the number of said different groups of atoms for applying radiant energy of said given frequencies to said mass of material, control means for operating said plurality of input means to apply radiant energy of a combination of said given frequencies to said mass of material corresponding to the combination of bits forming a plural bit data item to be stored, said applied energy shifting a corresponding number of said plurality of groups of atoms from said first molecular structure to said second molecular structure to provide a pattern of first and second molecular structures representing said stored data item, detecting means coupled to said mass of material and responsive to energy radiated from said material representative of said pattern of first and second molecular structures for producing an indication of the data item stored in said material, and means for rendering said detecting means effective.

6. The data storage unit set forth in claim 5 in which said control means includes oscillator means supplying alternating current signals over a range of frequency including said given frequencies and in which said plurality of input means includes inductive means selectively energized by said oscillator means and disposed adjacent said mass of material.

7. The data storage unit set forth in claim 5 in which said detecting means includes a plurality of filters each responsive to one of the nuclear magnetic resonant frequencies of said groups of atoms.

8. The data storage unit set forth in claim 7 in which said means for rendering said detecting means effective includes oscillator means for applying an alternating current field to said mass of material which includes a component of the nuclear magnetic resonant frequency of each of said groups of atoms.

References Cited in the file of this patent

UNITED STATES PATENTS

| | | |
|---|---|---|
| 2,589,484 | Herschberger | Mar. 18, 1952 |
| 2,700,147 | Tucker | Jan. 18, 1955 |
| 2.705,790 | Hahn | Apr. 5, 1955 |